No. 706,059. Patented Aug. 5, 1902.
M. L. HOUDER.
ANGLE COCK FOR AIR BRAKE MECHANISM.
(Application filed Feb. 15, 1902.)
(No Model.) 2 Sheets—Sheet 2.
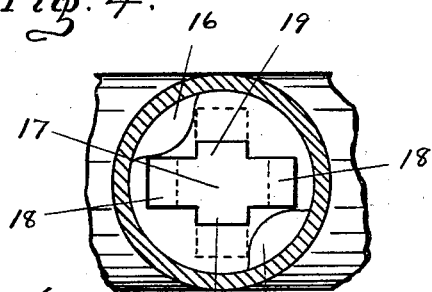
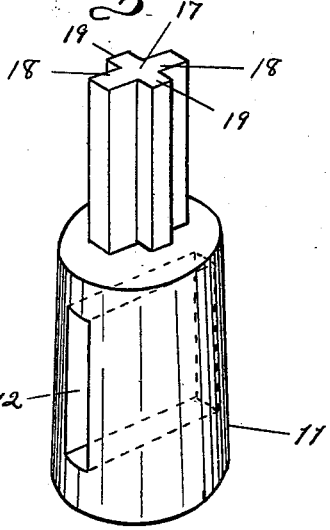
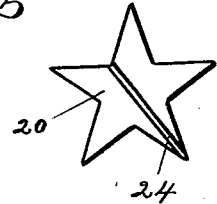
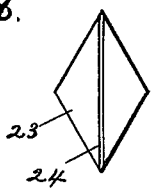
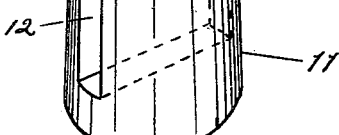
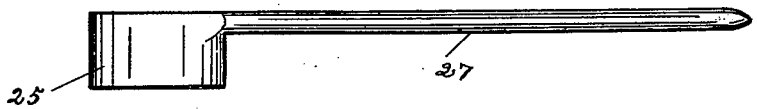
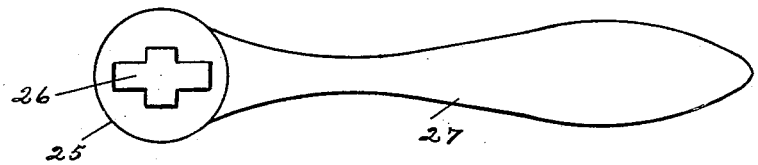
WITNESSES:
Adelaide Kearns.
Augusta Viberg.
Martin L. Houder INVENTOR
BY Chapin & Denny
His ATTORNEYS.

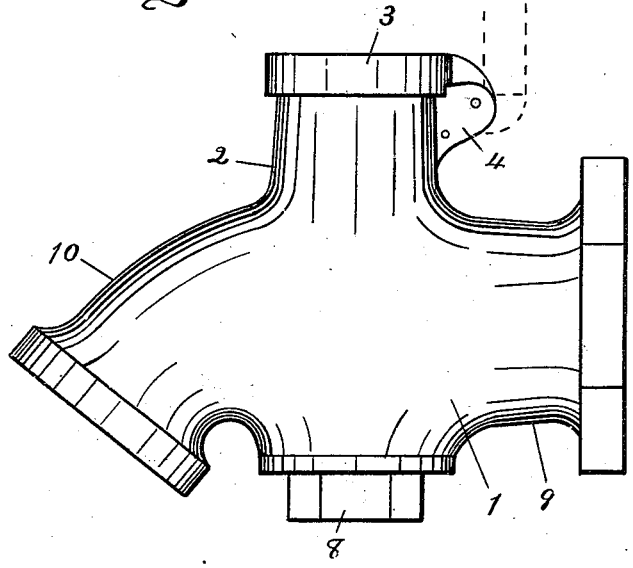
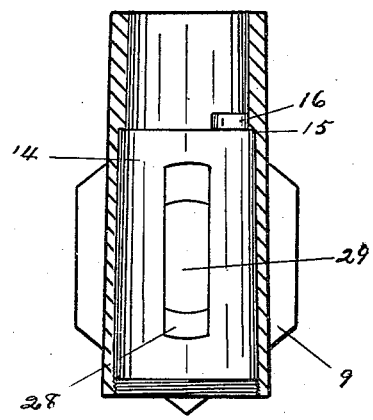
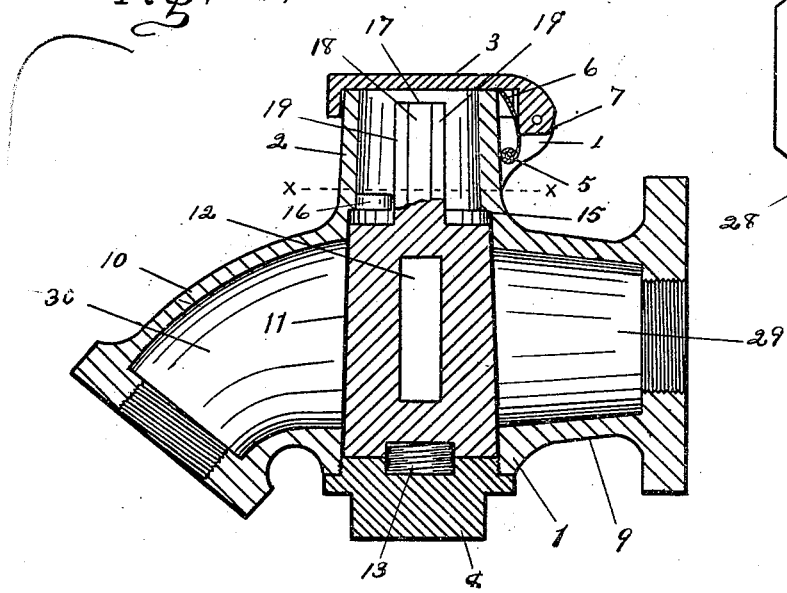

UNITED STATES PATENT OFFICE.

MARTIN L. HOUDER, OF FORT WAYNE, INDIANA.

ANGLE-COCK FOR AIR-BRAKE MECHANISM.

SPECIFICATION forming part of Letters Patent No. 706,059, dated August 5, 1902.

Application filed February 15, 1902. Serial No. 94,173. (No model.)

*To all whom it may concern:*

Be it known that I, MARTIN L. HOUDER, a citizen of the United States, residing at Fort Wayne, in the county of Allen, in the State of Indiana, have invented certain new and useful Improvements in Angle-Cocks for Air-Brake Mechanism; and I do hereby declare that the following is a full, clear, and exact description of the invention, which will enable others skilled in the art to which it appertains to make and use the same, reference being had to the accompanying drawings, which form part of this specification.

My invention relates to improvements in angle-cocks for air-brake mechanism specially designed and adapted to increase the safety of such mechanism.

It is well known that in the angle-cocks now in common use for air-brake mechanism the operating-handle therefor is rigidly fixed on the top of the rotary valve or "key," not only in view at all times, but is also open to either malicious or accidental derangement, that a frequent cause of wrecks and collisions is the failure of the air to work in an emergency, and that such failure of the air-brake mechanism is often, if not generally, caused by the accidental or malicious interference with the angle-cock handle by tramps or others riding between the cars or of persons climbing over the coupling between the cars, particularly by thus closing the valve in an angle-cock on one of the forward cars, thereby shutting off all control of the brake mechanism by the engineer. It is also well known that derangement of the air-brake mechanism is often caused by the accidental striking of the said operating-handle by the adjacent dangling safety-chains or other objects.

The primary object of my present invention is to materially increase the safety of air-brake mechanism by providing an angle-cock therefor so constructed and arranged that the angle-cock valve is contained and concealed within the valve-casing instead of protruding therefrom and the operating-handle therefor is carried by the trainmen instead of being fixed in position, thereby making it very difficult, if not impossible, for one not having a key to either open or close the valve or otherwise interfere with it.

My invention consists of an angle-cock casing of common form having a vertical central chamber for the valve and having its ends internally screw-threaded for connection with the train-pipe and hose-coupling, respectively, in the usual manner, but having the upper end of the valve-chamber so extended as to inclose the upper end of the valve, a hinged lid closing the top of said valve-chamber, a rotary valve having a diametric inlet-opening and having its upper end provided with an angular lug by means of which the valve is rotated, and a detachable operating handle or key for actuating the said valve.

The object of my present invention is accomplished by the mechanism illustrated in the accompanying drawings, in which—

Figure 1 is a side view of my improvement with the opened lid shown in dotted outline. Fig. 2 is a vertical central section of the same with the valve in its closed position and showing the relative arrangement of the operative parts. Fig. 3 is a vertical central section of Fig. 1, taken at right angles to that taken in Fig. 2, with the rotary valve, the lid, and the means for closing the lower open end of the valve-chamber omitted. Fig. 4 is a plan view of the valve in position in the valve-casing, broken away in part, showing the opposite lateral lugs in the valve-chamber which limit the rotation of the valve and also showing in dotted outline the position of the valve when it is open. Fig. 5 is a perspective detail of the valve, showing one form of lug adapted to be gripped by the operating-handle. Figs. 6, 7, 8, and 11 are modified forms of the said valve-lug. Fig. 9 is a side view of the operating-handle, and Fig. 10 is a bottom plan of the same.

The valve-casing 1, of the usual or other proper general contour, has its upright central portion 2, forming the valve-chamber, extended upwardly sufficiently to inclose the upper end of the valve and has its open top closed by a hinged lid 3, pivotally mounted in the lateral lugs 4. On a pin 5 and between the lugs 4 is fixed the lower end of the bent spring 6, Fig. 2, whose upper end rests in a small recess in the adjacent edge of the chambered extension 2. This spring bears firmly against the hinged portion 7 of the lid 3, thereby securing the lid in its closed position, as the lid must be raised against the tension of this spring. This casing 1 has the lower end of the valve-chamber closed by a screw-threaded cap 8, and this casing is provided with the usual lateral internally-screw-threaded bosses 9 and 10, adapted for a screw-threaded connection with the train-pipe and hose-coupling, respectively, in the usual and well-understood manner.

The valve 11, made of one piece of metal and frusto-conical in form, has a diametric longitudinal slot 12 of proper size adapted to stand in alinement with the train-pipe when the valve is wide open for the passage of air, which is the position shown in Fig. 4. This valve 11 is inserted into its chamber 14 from below and is firmly held in position by the coil-spring 13, whose upper end rests in a recess in the lower end of the valve and whose lower end rests in a recess in the inner face of the cap 8. The valve-chamber 14 has an annular shoulder 15, adapted to limit the upward adjustment of the valve as it wears by use, and is provided with a pair of diametric lateral lugs 16, adapted to limit the valve 11 to a one-fourth turn in the manner hereinafter described. This valve-chamber is provided with a pair of oppositely-arranged lateral slots or openings 28, Fig. 3, in register with the openings 29 and 30 of the respective bosses 9 and 10, Fig. 2. The valve 11 is provided upon its upper end with an angular extension 17 of any desired form or contour, preferably in the form of a cross, as shown in Figs. 2, 4, and 5, the long arms 18 of which are arranged in alinement with the said slot 12, while the short arms 19 will be at right angles thereto. The arms 18 are adapted to engage the said lugs 16, respectively, in the operation of the valve, while the arms 19 are adapted to pass or clear the same, thereby adapting the said valve for a one-quarter turn in opening or closing the same. Obviously the form of the extension 17 is wholly immaterial so long as its periphery is more or less angular to enable the operating-handle to firmly grasp the same. This extension 17 may have a periphery in the form of a star 20, Fig. 6, or of a triangle 21, Fig. 7, or of the rectangle 22, Fig. 8, or of a diamond 23, Fig. 11. When any one of these forms is employed, a groove 24 should be arranged across the upper end thereof in alinement with the slot 12 to enable the trainmen to tell at a glance when the lid 3 is raised whether the valve is open or closed. The means for operating this rotary valve 11 consists of a short portable operating lever or key, Figs. 9 and 10, preferably about six inches in length, consisting of a cylindrical head 25, having in its lower face a cross-shaped opening 26, adapted to snugly admit and contain the said angular top 17 of the valve 11 and having a proper integral handle 27. When either of the forms of valve extension shown in Figs. 6, 7, 8, and 11 or other desired form is employed, the opening 26 of the handle will of course correspond therewith and be adapted to fit over the same. The angular extension 17 is of course of proper size to permit the insertion of the head 25 in the upper end of the valve-chamber to embrace the said extension.

The operation and manner of employing my improvement are obvious and, briefly stated, are as follows: In the preferred form of my invention (shown in Figs. 2 and 4) the long arms 18 of the valve top or extension 17 are always in alinement with train-pipe when the valve is open and are at right angles therewith when the valve is closed, whereby the trainmen can always tell at a glance when the lid 3 is raised whether the valve is open or closed. When it is desired to close the valve 11, as in changing engines or in switching cars, the trainman takes the lever-handle (shown in Figs. 9 and 10) from his pocket, raises lid 3, and readily fits it down over the angular head of the valve and rotates the valve to its other limit against the lugs 18. He then removes his lever, returns it to his pocket, and closes the lid 3, after which all danger of tampering with the valve is reduced to a minimum. When it is desired to again open the valve 11 to the admission of air, the operator in like manner gives it a one-quarter turn, which sets the arms 18 again in alinement with the train-pipe and makes the slot 12 of the valve register with the opposite openings 28 of the valve-chamber 14.

Obviously the mechanical details of my improvement—such as the angular extension of the valve, the limiting-lugs in the valve-chamber, and the form of the operating-handle—may be variously modified without departing from the spirit and scope of my invention, which consists in providing an angle-cock whose valve is wholly contained within the valve-chamber and inaccessible to intruders or accidental derangement.

Having thus described my invention, what I desire to secure by Letters Patent is—

1. An angle-cock for air-brake mechanism consisting of a hollow casting having a central upright chamber provided with opposite openings or air-ports; a rotary valve loosely mounted in said chamber, having a diametric opening adapted to register with the said air-ports when the valve is open, and provided upon its upper end with an angular extension which is contained within said chamber and which is adapted to indicate whether the said valve is open or closed; means for limiting the valve to a quarter-turn; and detachable means for rotating said valve to either limit of its adjustment; and means for normally closing said valve-chamber.

2. The combination in an angle-cock for air-brakes, of a hollow valve-casing having a screw-threaded opening in each end thereof, and having a central upright open-ended valve-chamber communicating with the interior of the casing by means of lateral ports, as shown, and provided upon its inner face with a pair of opposite lateral lugs adapted to limit the rotation of the contained valve; an inlet-valve rotatably mounted in said chamber, having a diametric opening adapted to register with the said lateral ports as described, and provided with an angular extension upon the upper end thereof which is at all times within the said casing; and a hinged lid closing the upper end of said chamber.

3. In an angle-cock a valve-casing having an inlet-port in each end thereof, and a central open-ended valve-chamber provided with opposite lateral ports, and with means for limiting the rotation of the contained valve; an inlet-valve rotatably mounted in said chamber, and having an opening therein adapted to register with the said ports when the valve is open; means for normally concealing said valve in said chamber; detachable means for operating said valve and the described means for determining by inspection whether the said valve is open or closed.

Signed by me at Fort Wayne, Allen county, State of Indiana, this 11th day of February, A. D. 1902.

MARTIN L. HOUDER.

Witnesses:
ADELAIDE KEARNS,
AUGUSTA VIBERG.